United States Patent
Freund et al.

(10) Patent No.: US 11,143,300 B2
(45) Date of Patent: Oct. 12, 2021

(54) CLAMPING DEVICE WITH INDUCTIVE MONITORING UNIT

(71) Applicant: Pepperl+Fuchs SE, Mannheim (DE)

(72) Inventors: Thomas Freund, Mannheim (DE); Enrico Schulz, Mannheim (DE)

(73) Assignee: Pepperl + Fuchs SE, Mannheim (DE)

( * ) Notice: Subject to any disclaimer, the term of this patent is extended or adjusted under 35 U.S.C. 154(b) by 1 day.

(21) Appl. No.: 16/707,359

(22) Filed: Dec. 9, 2019

(65) Prior Publication Data
US 2020/0182272 A1    Jun. 11, 2020

(30) Foreign Application Priority Data
Dec. 7, 2018    (DE) ...................... 10 2018 009 534.8

(51) Int. Cl.
*F16J 7/00*    (2006.01)
*F15B 15/28*    (2006.01)

(52) U.S. Cl.
CPC ............... *F16J 7/00* (2013.01); *F15B 15/28* (2013.01)

(58) Field of Classification Search
CPC .............. F15B 15/2861; F15B 15/2892; F15B 15/2807; F15B 15/28; G01D 5/202; G01D 5/22; B25B 5/062
See application file for complete search history.

(56) References Cited

U.S. PATENT DOCUMENTS

| | | | |
|---|---|---|---|
| 4,549,469 A * | 10/1985 | Plester | ............... F15B 15/2861 92/5 R |
| 6,364,301 B1 | 4/2002 | Takahashi | |
| 6,714,004 B2 | 3/2004 | Jagiella | |
| 8,508,243 B2 | 8/2013 | Speckmann et al. | |
| 2006/0244440 A1 * | 11/2006 | Freund | ............... G01D 5/2006 324/207.17 |

(Continued)

FOREIGN PATENT DOCUMENTS

| | | |
|---|---|---|
| CN | 106369003 A | 2/2017 |
| CN | 208034473 U | 11/2018 |

(Continued)

OTHER PUBLICATIONS

Chinese Search Report dated Feb. 10, 2021 in corresponding application 201911239185.0.

*Primary Examiner* — Abiy Teka
*Assistant Examiner* — Daniel S Collins
(74) *Attorney, Agent, or Firm* — Muncy, Geissler, Olds & Lowe, P.C.

(57) ABSTRACT

A clamping device with a housing, with a piston with piston rod running in the housing, and with a monitoring unit arranged at least partially in the housing, wherein the monitoring unit includes at least two sensor units. The sensor units are spaced apart from one another along a longitudinal axis of the piston rod, and are arranged at a distance from the piston rod. The piston and the piston rod, and a metallic signal transmitter arranged on the piston or on the piston rod, are movable in a positively driven manner between a first end position and a second end position. The first sensor unit is arranged at the first end position of the signal transmitter, and the second sensor unit is arranged at the second end position of the signal transmitter. Each sensor unit has a first and second sensor and includes an induction coil and an oscillator.

6 Claims, 1 Drawing Sheet

(56) References Cited

U.S. PATENT DOCUMENTS

2008/0101895 A1    5/2008    Holcomb et al.

FOREIGN PATENT DOCUMENTS

| | | |
|---|---|---|
| DE | 3742974 A1 | 7/1988 |
| DE | 29718644 U1 | 12/1997 |
| DE | 29903825 U1 | 5/1999 |
| DE | 29903281 U1 | 7/1999 |
| DE | 19808631 A1 | 9/1999 |
| DE | 10025661 A1 | 12/2001 |
| DE | 102007010030 A1 | 9/2008 |
| EP | 1092509 A2 | 4/2001 |

* cited by examiner

CLAMPING DEVICE WITH INDUCTIVE MONITORING UNIT

This nonprovisional application claims priority under 35 U.S.C. § 119(a) to German Patent Application No. 10 2018 009 534.8, which was filed in Germany on Dec. 7, 2018, and which is herein incorporated by reference.

BACKGROUND OF THE INVENTION

Field of the Invention

The present invention relates to a clamping device with an inductive monitoring unit.

Description of the Background Art

From DE 297 18 644 U1, a toggle lever clamping device with a monitoring cartridge is known, wherein the monitoring cartridge has two switching elements that are spaced apart from one another. The switching elements can be locked in position at multiple discrete positions along a rail within the cartridge. The switching points determined by means of induction are critically dependent on the distance of the switching elements from the signal transmitter and on the temperature.

Another clamping device is known from DE 198 08 631 A1, wherein a coil arrangement that includes at least one coil extends along the entire positioning travel of the transmitter.

A circuit arrangement for determining the ride height of a vehicle is known from DE 37 42 974 A1, wherein the arrangement has a sensor with two coils that are arranged to be coaxial to a shock absorber piston and that supply a bridge circuit.

A position measurement system with a transmitter and a sensor is known from DE 100 25 661 A1, which corresponds to U.S. Pat. No. 6,714,004, wherein the sensor includes one or two inductive elements coupled to an oscillator.

A gripping device with an inductively operating sensor unit that detects the gripping jaw position is known from US 2008/0101865 A1.

SUMMARY OF THE INVENTION

It is therefore an object of the invention to provide a device that advances the state of the art and, in particular, produces more reliable, more precise switching signals.

According to an exemplary embodiment of the invention, a clamping device with a housing, with a piston with piston rod running in the housing, and with a monitoring unit arranged at least partially in the housing is provided, wherein the monitoring unit includes at least two sensor units.

The sensor units are spaced apart from one another along a longitudinal axis of the piston rod, and are arranged at a distance from the piston rod.

The piston and the piston rod, as well as a metallic signal transmitter arranged on the piston or on the piston rod, are positively driven and are movable between a first end position and a second end position.

In addition, the first sensor unit can be arranged at the first end position of the signal transmitter in a direction parallel to the longitudinal axis, and the second sensor unit can be arranged at the second end position of the signal transmitter in a direction parallel to the longitudinal axis.

Each sensor unit can have a first inductive sensor with a first sensitivity curve and a second inductive sensor with a second sensitivity curve.

Each first sensor and each second sensor can include an induction coil as part of an oscillator.

The induction coil of the first sensor can have a first distance from the induction coil of the second sensor of the same sensor unit, from coil center to coil center, in a direction parallel or substantially parallel to the longitudinal axis of the piston rod, wherein the two sensitivity curves partially overlap.

The monitoring unit can be, for example, a monitoring cartridge that is replaceable as a whole in the form of a printed circuit board with fastening elements for fastening to, or at least partially in, the housing of the clamping device, e.g., a toggle lever clamping device.

The sensitivity curves of the first sensor and of the second sensor can be identical or substantially identical or different. It should be noted that the sensitivity curve can also be described as sensitivity ranges. The relevant sensitivity curves determine the maximum detection range of the relevant sensor.

It is a matter of course that the arranging of the signal transmitter on the piston or on the piston rod includes all arrangement possibilities that result in the signal transmitter moving along with the piston and the piston rod in a positively driven manner.

An advantage of the device according to the invention is that the position determination by the sensor units according to the invention is independent in the first approximation of the distance of the sensor units from the signal transmitter. As a result, a calibration is rendered unnecessary, in particular, of the monitoring unit after insertion into the clamping device, in particular in the case of replacement and repair.

Another advantage is that the switching signals produced are essentially independent of temperature, and thus more reliable, due to the use in each case of two sensors per sensor unit or per switching point.

The clamping device according to the invention additionally makes it possible for a user to shift the switching point if necessary or to adjust it to his own wishes/basic conditions by means of a control unit and with no physical or structural change to the setup.

The signal transmitter can have a first width parallel to the longitudinal axis of the piston rod, wherein the first width corresponds in each case to the first distance between the induction coils of each sensor unit. Alternatively, the first width corresponds in each case to n times the first distance with $0.9 \leq n \leq 1.1$.

Each sensor can have a sensitivity curve and the first distance is chosen such that the sensitivity curves of the first sensor and of the second sensor of a sensor unit partially overlap.

The first sensor unit and the second sensor unit can each be designed to issue a switching signal when the detection signal generated by the signal transmitter for one sensor of the sensor unit is located on a rising edge of the respective sensitivity curve and at the same time the detection signal generated by the signal transmitter for the other sensor of the same sensor unit is located on a falling edge.

The first sensor unit and the second sensor unit can each be designed to issue a switching signal when the detection signal generated by the signal transmitter for the first sensor of the sensor unit and the detection signal generated by the signal transmitter for the second sensor of the same sensor unit correspond to one another or correspond except for a predetermined maximum difference, wherein the detection signals are each greater than a predetermined minimum value.

As a result of the determination of the switching signals on the basis of two sensitivity curves, on the one hand a very reliable switching point can be ensured. On the other hand, the two induction coils involved in each case permit simple individual adjustment of the switching point.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
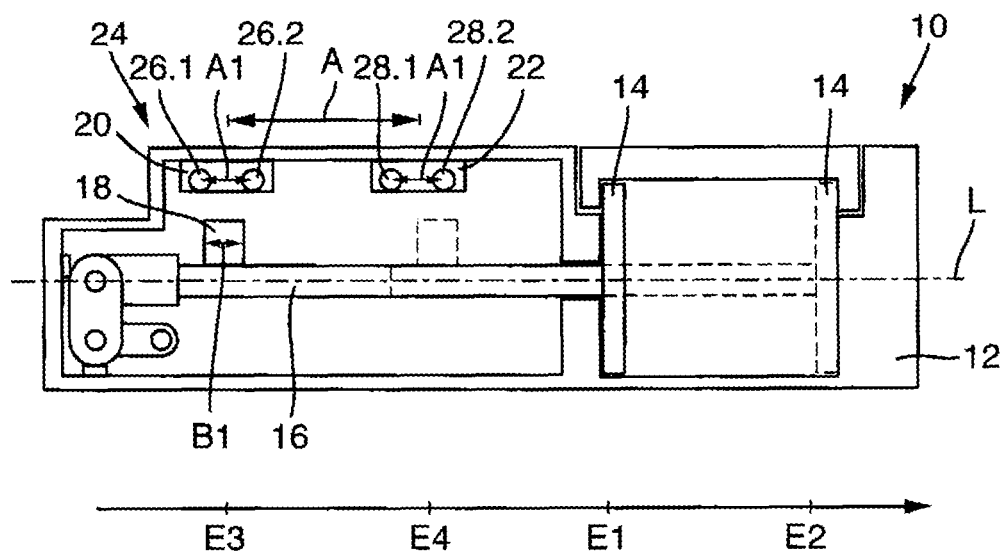
FIG. 1 shows a schematic view of a clamping device according to an exemplary embodiment.

The illustration in FIG. 1 schematically shows a clamping device 10 according to the invention implemented as a toggle lever clamping device. The clamping device includes a housing 12 and a piston 14 with piston rod 16 running between a first end position E1 and a second end position E2. The piston 14 on the piston rod 16 is designed to execute a constrained motion between the two end positions E1 and E2, wherein the direction of motion coincides with a longitudinal axis L of the piston rod.

In the exemplary embodiment shown, a metallic signal transmitter 18 is arranged on the piston rod 16. For the first end position E1 of the piston 14, the signal transmitter assumes a corresponding first end position E3, and for the second end position E2 of the piston 14, assumes a corresponding second end position E4.

Likewise arranged in the housing 12 are a first sensor unit 20 and a second sensor unit 22, wherein the two sensor units constitute a part of a monitoring unit 24, and additional parts of the monitoring unit, as for example a printed circuit board with analysis logic, are not shown.

The two sensor units 20 and 22 are each arranged at a distance from the piston rod 16. The first sensor unit 20 is arranged at the first end position E3 of the signal transmitter in the direction of the longitudinal axis of the piston rod 16, and the second sensor unit 22 is arranged at the second end position E4 of the signal transmitter so that the two sensor units 20 and 22 have a distance A from one another in a direction that runs parallel to the piston rod 16.

Each sensor unit 20 and 22 has one first sensor 26.1 or 26.2, respectively, and one second sensor 28.1 or 28.2, wherein each sensor 26.1, 26.2, 28.1, 28.2 includes one induction coil and one oscillator.

The two sensors 26.1 and 26.2 or 28.1 and 28.2 of a sensor unit 20 or 22 are arranged such that the induction coil of the first sensor 26.1 or 28.1 in each case has a first distance A1, from coil center to coil center, from the induction coil of the second sensor 26.2 or 28.2 of the same sensor unit 20 or 22 in a direction parallel to the longitudinal axis L of the piston rod 16.

The signal transmitter 18 has, in a direction parallel to the longitudinal axis L of the piston rod 16, a first width B1 corresponding to the first distance A1.

Figure 2:
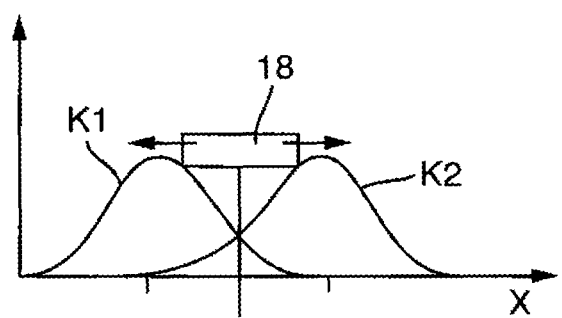
FIG. 2 shows a schematic view of sensitivity curves of a sensor unit according to the invention.

Shown by way of example in the illustration from FIG. 2, the sensitivity curve K1 of the first sensor 26.1 or 26.2 and the sensitivity curve K2 of the second sensor 28.1 and 28.2 are plotted over a position x of the signal transmitter 18. In the exemplary embodiment shown, the two sensors are normalized so that the two sensitivity curves K1 and K2 have the same maximum value or the same curve. The distance between the respective maxima of the sensitivity curves K1 and K2 corresponds to the first distance A1 between the induction coils of the sensors. The first distance is chosen such that the two sensitivity curves K1 and K2 overlap.

If the signal transmitter 18 is located, as shown, exactly in the center between the two sensors, then it follows from the sensitivity curves K1 and K2 that the detection signals generated in the two sensors by the signal transmitter 18 have the same value. This is independent of an absolute height or an absolute value of the sensitivity curves or the detection signals. This position of the signal transmitter 18 can thus be uniquely and reliably determined, independently of a lateral distance between signal transmitter and sensors.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A clamping device comprising:
   a housing;
   a piston with a piston rod movably arranged in the housing;
   a monitoring unit arranged at least partially in the housing, the monitoring unit having a first sensor unit and a second sensor units, the first and second sensor units being spaced apart from one another along a longitudinal axis of the piston rod and are arranged at a distance from the piston rod; and
   a metallic signal transmitter arranged on the piston or on the piston rod,
   wherein the piston and the piston rod as well as the metallic signal transmitter are movable in a positively driven manner between a first end position and a second end position,
   wherein the first sensor unit is arranged at the first end position of the signal transmitter in a direction substantially parallel to the longitudinal axis, and the second sensor unit is arranged at the second end position of the signal transmitter in a direction substantially parallel to the longitudinal axis,
   wherein the first and the second sensor unit have a first inductive sensor with one first sensitivity curve and a second inductive sensor with one second sensitivity curve each,
   wherein the first inductive sensor of the first and the second sensor unit and the second inductive sensor of the first and the second sensor unit include an induction coil as part of an oscillator,
   wherein the induction coil of the first sensor has a first distance from the induction coil of the second sensor of a same sensor unit, from coil center to coil center, in a direction substantially parallel to the longitudinal axis of the piston rod, wherein the first and the second sensitivity curves of the first and the second sensors partially overlap, and wherein the first sensor unit and the second sensor unit are each designed to issue a switching signal when a detection signal generated by the signal transmitter for a sensor of the first or second sensor unit is located on a rising edge of the respective sensitivity curve and at the same time the detection signal generated by the signal transmitter for the other sensor of the same sensor unit is located on a falling edge.

2. The clamping device according to claim 1, wherein the signal transmitter has a first width parallel to the longitudinal axis of the piston rod, wherein the first width corresponds in each case to the first distance between the induction coils of each of the first and second sensor units, or the first width corresponds to n times the first distance, with $0.9 \le n \le 1.1$.

3. The clamping device according to claim 1, wherein the first and second sensitivity curves of the first and second sensors are identical.

4. A clamping device comprising:
a housing;
a piston with a piston rod movably arranged in the housing;
a monitoring unit arranged at least partially in the housing, the monitoring unit having a first sensor unit and a second sensor units, the first and second sensor units being spaced apart from one another along a longitudinal axis of the piston rod and are arranged at a distance from the piston rod; and
a metallic signal transmitter arranged on the piston or on the piston rod,
wherein the piston and the piston rod as well as the metallic signal transmitter are movable in a positively driven manner between a first end position and a second end position,
wherein the first sensor unit is arranged at the first end position of the signal transmitter in a direction substantially parallel to the longitudinal axis, and the second sensor unit is arranged at the second end position of the signal transmitter in a direction substantially parallel to the longitudinal axis,
wherein the first and the second sensor unit have a first inductive sensor with one first sensitivity curve and a second inductive sensor with one second sensitivity curve each,
wherein the first inductive sensor of the first and the second sensor unit and the second inductive sensor of the first and the second sensor unit include an induction coil as part of an oscillator,
wherein the induction coil of the first sensor has a first distance from the induction coil of the second sensor of a same sensor unit, from coil center to coil center, in a direction substantially parallel to the longitudinal axis of the piston rod,
wherein the first and the second sensitivity curves of the first and the second sensors partially overlap, and
wherein the first sensor unit and the second sensor unit are each designed to issue a switching signal when a detection signal generated by the signal transmitter for the first sensor of the sensor unit and the detection signal generated by the signal transmitter for the second sensor of the same sensor unit correspond to one another or correspond except for a predetermined maximum difference, and wherein the detection signals are each greater than a predetermined minimum value.

5. The clamping device according to claim 1, wherein the piston, the piston rod, and the metallic signal transmitter are driven from the first end position to the second end position and from the second end position to the first end position.

6. The clamping device according to claim 1, wherein the piston, the piston rod, and the metallic signal transmitter are driven from the first end position to the second end position along a first axis parallel to the longitudinal axis of the piston rod,
wherein the first inductive sensor of the first sensor unit and the second sensor unit and the second inductive sensor of the first sensor unit and the second sensor unit are disposed along a second axis, the first axis and the second axis being parallel.

\* \* \* \* \*